United States Patent [19]

Nagao et al.

[11] Patent Number: 5,587,927
[45] Date of Patent: Dec. 24, 1996

[54] DETECTING APPARATUS FOR DETECTING A CONTOUR OF A MOVING REGION IN A DYNAMIC IMAGE

[75] Inventors: Kenji Nagao, Watertown, Mass.; Masaki Sohma, Kawasaki, Japan; Shigeru Ando, Chiba, Japan; Michihiro Kobayakawa, Chigasaki, Japan

[73] Assignee: Matsushita Electric Industrial Co., Ltd., Osaka, Japan

[21] Appl. No.: 178,163

[22] Filed: Jan. 6, 1994

[30] Foreign Application Priority Data

Mar. 26, 1993 [JP] Japan ................... 5-067825

[51] Int. Cl.$^6$ ................... G06K 9/46
[52] U.S. Cl. ................... 364/514 A; 382/236
[58] Field of Search ................... 364/514, 516, 364/554, 514 A; 382/16, 17, 22, 27, 236, 239, 254, 256, 276, 282

[56] References Cited

U.S. PATENT DOCUMENTS

| 5,091,967 | 2/1992 | Ohsawa | 382/22 |
| 5,311,305 | 5/1994 | Mahadevan et al. | 348/169 |
| 5,365,603 | 11/1994 | Karmann | 382/48 |

OTHER PUBLICATIONS

"Detecting Contours In Image Sequences", Kenji Nagao et al., IEICE Transactions on Information and Systems, vol. E76-D, No. 10, pp. 1162–1173, Oct. 1993.

Primary Examiner—Emanuel T. Voeltz
Assistant Examiner—Edward Pipala
Attorney, Agent, or Firm—Lowe, Price, LeBlanc & Becker

[57] ABSTRACT

A detecting apparatus consists of a covariance calculating section for calculating covariances $S_{ij}=\iiint(f_i*f_j)dxdydt$ ($i,j\in\{x,y,t\}$) with gradients $f_x$, $f_y$ and $f_t$ of variable densities of pixels, a characteristic value calculating section for calculating characteristic values by utilizing the covariances to express characteristic changes in the variable densities of the pixels, a first-stage pixel classifying section for classifying the pixels into a FIX type denoting that an observed pixel is positioned in a static region of the dynamic image, a MOT type denoting that the observed pixel is positioned inside the moving region and an ACR type denoting that the observed pixel is positioned in a boundary region between the moving and the static regions, a second-stage pixel classifying section for re-classifying the pixels to match a classification type of the observed pixel with those of pixels surrounding the observed pixel, a contour candidate limiting section for limiting a region occupied by pixels re-classified into the ACR type as a candidate region, and a contour drawing section for drawing a contour of the moving section passing through a middle portion of the candidate region.

17 Claims, 6 Drawing Sheets

DETECTING APPARATUS FOR DETECTING A CONTOUR OF A MOVING REGION IN A DYNAMIC IMAGE

BACKGROUND OF THE INVENTION

1. Field of the Invention

The present invention relates to a detecting apparatus of a contour of a moving region in a dynamic image which is applied for a control technique, an edition technique and a detection technique of a dynamic image in a multi-media computer system, a compression technique of a dynamic image in a dynamic image communication such as a visual telephone or a distributed meeting system, and a picture editing technique in a broadcasting field or an image manufacturing field.

2. Description of the Related Art

To efficiently display a series of frames of dynamic image changing with time in a displaying unit, picture elements (or pixels) positioned at a contour of a moving region in each of the frames of dynamic image are specified to detect the contour of the moving region for the purpose of distinguishing a moving object positioned in the moving region. Therefore, two types of detecting apparatuses for detecting a contour of a moving region have been conventionally known. A first type of detecting apparatus is based on the calculation of an optical flow of a dynamic image for each of pixels. The optical flow is a field of vector which shows the dislocation of each pixel point from frame to frame, so that the optical flow denotes a changing speed of the dynamic image. A second type of detecting apparatus is based on a Snake model and the calculation of a spatial energy change in a variable density of each pixel such as light and shade. The Snake model is originally utilized to accurately detect a contour of a static object in a static image, and it is required of a user in the Snake model to manually input an initial contour of a moving region.

2.1. Previously Proposed Art

The first type of detecting apparatus is described with reference to FIG. 1.

As shown in FIG. 1, a first conventional detecting apparatus 11 is provided with an optical flow calculating section 12 for calculating an optical flow of a dynamic image for each of pixels to determine a speed field of the dynamic image, a gradation filter applying section 13 for applying a gradation filtering such as a Gause filtering to the speed field to grade the speed field, and an edge detecting section 14 for detecting an edge of the speed field by applying an edge detecting operator such as a Laplacian filter to the speed field graded in the section 13.

In the above configuration, an optical flow of a dynamic image is initially calculated for each of pixels in the section 12. Therefore, a speed field of the dynamic image is determined. Thereafter, the speed field is graded in the section 13, and the speed field graded is filtered by the edge detecting operator in the section 14. Therefore, an edge of the speed field is detected as a contour of a moving region.

Accordingly, the contour of the moving region in the dynamic image can be accurately detected on condition that the speed field is accurately determined in the section 12.

2.2. Another Previously Proposed Art

The second type of detecting apparatus is described with reference to FIG. 2. In this case, a dynamic image consists of a series of frames of dynamic image.

As shown in FIG. 2, a second conventional detecting apparatus 21 is provided with an initial contour inputting section 22 for inputting an initial contour of a moving region in a frame of dynamic image, a spatial changing energy calculating section 23 for calculating a spatial energy of an contour of the moving region for each of pixels to determine the change of the spatial energies in the contour of the moving region, a contour smoothness calculating section 24 for calculating the smoothness of a curvature of the contour of the moving region, a contour renewing section 25 for repeatedly renewing the contour of the moving region to reduce the change of the spatial energies determined in the section 23 while maintaining the smoothness of the contour of the moving region calculated in the section 24, a locally minimized spatial energy change judging section 26 for judging whether or not the change of the spatial energies of the renewed contour is locally minimized, and a contour outputting section 27 for outputting the renewed contour of the moving region when it is judged in the judging section 26 that the change of the spatial energies is locally minimized. The renewed contour is also input to the inputting section 22 as an initial contour of a moving region in a succeeding frame of dynamic image to repeatedly determine an output line of a succeeding moving region in the succeeding frame of dynamic image.

In the above configuration, an initial contour of a moving region in an initial frame of dynamic image is manually input to the inputting section 22 by an user. Thereafter, the initial contour is renewed in the renewing section 25 to generate a renewed contour of the moving region in the initial frame of dynamic image, and the renewed contour is repeatedly renewed in the renewing section 25. In this case, the change of the spatial energies of the renewed contour is determined in the section 23 each time the renewed contour is renewed again, and the renewed contour is repeatedly renewed to reduce the change of the spatial energies of the renewed contour. Also, the smoothness of the renewed contour is calculated in the section 24 each time the renewed contour is renewed again, and the smoothness of the renewed contour is maintained.

When the change of the spatial energies of the renewed contour is locally minimized, the change of the spatial energies locally minimized is judged in the judging section 26. Therefore, the repeated operation performed in the renewing section 25 is stopped, and the renewed contour finally obtained in the renewing section 25 is output to the outputting section 27 as a calculated contour of the moving region in the initial frame of dynamic image. In other words, the contour of the moving region in one of the frames of dynamic image is detected.

Thereafter, the renewed contour of the moving region in the initial frame of dynamic image is input to the inputting section 22 as an initial contour of a succeeding moving region in a succeeding frame of dynamic image to calculate a contour of the succeeding region in the succeeding frame of dynamic image. Therefore, contours of succeeding frames of dynamic image can be detected by repeatedly performing the procedure in the sections 22 to 27.

Accordingly, moving regions in a series of frames of dynamic image can be obtained on condition that a contour of a moving region in an initial frame of dynamic image is manually input to the inputting section 22 by an user.

2.3. Problems to be Solved by the Invention

However, the speed field of the dynamic image cannot be stably determined in the calculating section 12 of the first type of detecting apparatus 11. Therefore, because the operations in the sections 13, 14 are performed on the basis of the speed field unstably determined in the calculating section 12, there is a drawback that the contour of the moving region cannot be reliably detected.

Also, optical flow information inherently determined for a dynamic image is not utilized in the second type of detecting apparatus 21, and it is required of a user to manually input a contour of a moving region in an initial frame of dynamic image. Therefore, there is a drawback that the application of the detecting apparatus 21 is limited.

In addition, the spatial energy changes in the variable densities of the pixels such as light and shade are utilized as image information in the second type of detecting apparatus 21, and there is a rapid change of a variable density not corresponding to a contour of a moving region in a general situation. Therefore, it is required that a supposed contour of a moving region in an initial frame of dynamic image input to the inputting section 22 is set to positions near to a true contour of the moving region. Accordingly, it is difficult to strictly input a supposed contour of a moving region for the purpose of detecting the contour of the moving region according to the Snake model.

SUMMARY OF THE INVENTION

An object of the present invention is to provide, with due consideration to the drawbacks of such a conventional detecting apparatus, a detecting apparatus of a contour of a moving region in a dynamic image in which inherent characteristics of a dynamic image are taken out without calculating any speed field and a contour of a moving region is stably detected with a high accuracy without requiring of a user to input an initial contour or without limiting the application of the detecting apparatus.

The object is achieved by the provision of a detecting apparatus of a contour of a moving region, comprising:

inputting means for inputting a series of frames of dynamic image which consists of variable densities $F(x,y,t)$ of pixels;

variable density gradient calculating means for calculating a variable density gradient $fx=\partial F(x,y,t)/\partial x$ defined as an x directional gradient of the variable densities $F(x,y,t)$ input to the inputting means, a variable density gradient $fy=\partial F(x,y,t)/\partial y$ defined as a y directional gradient of the variable densities $F(x,y,t)$ input to the inputting means and a variable density gradient $ft=\partial F(x,y,t)/\partial t$ defined as a time-based variation of the variable densities $F(x,y,t)$ input to the inputting means, for each of the pixels;

covariance calculating means for calculating covariances Sxx, Sxy, Sxt, Syx, Syy, Syt, Stx, Sty and Stt according to an equation $$Sij=\iiint (fi*fj)dxdydt \ (i,j \in \{x,y,t\})$$

for each of the pixels by utilizing the variable density gradients fx, fy and ft calculated in the variable density gradient calculating means, integration ranges being limited in a space-time region of an observed pixel selected from the pixels and another space-time region of neighboring pixels positioned near to the observed pixel;

inherent characteristic extracting means for extracting first, second, third and fourth inherent characteristics of the dynamic image by utilizing the covariances Sxx, Sxy, Sxt, Syx, Syy, Syt, Stx, Sty and Stt calculated in the covariance calculating means, the first inherent characteristic being utilized to judge whether or not an observed pixel selected from the pixels is positioned in a texture drawn in the dynamic image, the second inherent characteristic being utilized to judge whether the texture in which the observed pixel is positioned is a one-dimensional texture changing in a direction only or a two-dimensional texture changing in a x-y plane, the third inherent characteristic being utilized to judge whether luminous intensity of the observed pixel positioned in the one-dimensional texture changes in a motional change or a non-motional change, and the fourth inherent characteristic being utilized to judge whether luminous intensity of the observed pixel positioned in the two-dimensional texture changes in the motional change or the non-motional change;

pixel classifying means for classifying one or more pixels into first or second classification type by utilizing the first to fourth inherent characteristics extracted in the inherent characteristic extracting means, the first classification type (S1-ACR) denoting that an observed pixel selected from the pixel is positioned in the one-dimensional texture and the luminous intensity of the observed pixel changes with time in a non-motional change, and the second classification type (S2-ACR) denoting that the observed pixel is positioned in the two-dimensional texture and the luminous intensity of the observed pixel changes with time in the non-motional change;

contour candidate limiting means for recognizing first pixels classified into the first classification type and second pixels classified into the second classification type in the pixel classifying means to be positioned in a boundary region between the moving region and a static region of the dynamic image and limitedly regarding a region occupied by the first and second pixels as a candidate region for a contour of the moving region; and contour detecting means for detecting a contour of the moving region by adopting a line passing through a middle portion of the candidate region limitedly determined in the contour candidate limiting means as the contour of the moving region.

In the above configuration, a series of frames of dynamic image consists of variable densities $F(x,y,t)$ of pixels, and a moving object is displayed in the dynamic image. Therefore, a region of the dynamic image is composed of a moving region in which the moving object is positioned and a static region in which any moving object is not positioned. The variable densities of the pixels change with the elapse of time according to inherent characteristics of the dynamic image. That is, the variable densities of the pixels generally change in dependent on positions of the pixels in the dynamic image. Therefore, a contour of the moving region is determined in the present invention by classifying the pixels into pixels positioned inside the static region, pixels positioned inside the moving region and pixels positioned in a boundary region between the static and moving regions.

The inherent characteristics of the dynamic image is described.

For example, because a texture drawn in the dynamic image changes in a particular direction only or two directions regardless of whether the texture is positioned in the moving object, variable density gradients fx, fy at a position of an observed pixel linearly relates to each other in cases where the observed pixel is positioned at an edge of a light or shade portion in the texture. In mathematics, $a*fx+b*fy=0$ where the symbols a, b are a constant is satisfied. Therefore, a distribution of a spatial gradient (fx, fy) is degenerated to a one-dimensional distribution.

In contrast, the spatial gradient (fx, fy) of the variable densities $F(x,y,t)$ is generally distributed in a two-dimension in cases where the observed pixel is positioned inside the light or shade portion in the texture.

Also, in cases where the observed pixel is positioned inside the moving object, the variable density of the observed pixel changes in a motional change, and the variable density gradients fx, fy and ft linearly relate in a space-time gradient (fx, fy, ft), as is well known. In mathematics, a*fx+b*fy+c*ft=0 where the symbol c is a constant is satisfied. Therefore, a distribution of the space-time gradient (fx, fy, ft) is degenerated to a two-dimensional distribution.

In contrast, in cases where the observed pixel is positioned at the boundary region, the variable density of the observed pixel changes in a non-motional change, and the space-time gradient (fx, fy, ft) is generally distributed in a three-dimension. The non-motional change denotes accretion (or occurrence) or disappearance of a moving object.

Accordingly, the characteristic changes in the variable densities of the pixels can be expressed by the degree of the dimension in which the space-time gradient (fx, fy, ft) of variable densities is distributed.

Because the degree of the dimension expressing the characteristic changes in the variable densities of the pixels can be analyzed by utilizing the covariances of the variable density gradients fx, fy and ft, the covariances Sxx, Sxy, Sxt, Syx, Syy, Syt, Stx, Sty and Stt are calculated in the covariance calculating means after the variable density gradients fx, fy and ft are calculated in the variable density gradient calculating means.

Thereafter, first to fourth inherent characteristics utilized to judge types of the characteristic changes in the variable densities of the pixels are extracted in the inherent characteristic extracting means by utilizing the covariances Sxx, Sxy, Sxt, Syx, Syy, Syt, Stx, Sty and Stt. In detail, whether or not an observed pixel is positioned in a texture drawn in the dynamic image is judged by utilizing the first inherent characteristics, whether the texture in which the observed pixel is positioned is a one-dimensional texture or a two-dimensional texture is judged by utilizing the second inherent characteristics, whether luminous intensity of the observed pixel positioned in the one-dimensional texture changes in a motional change or a non-motional change is judged by utilizing the third inherent characteristics, and whether luminous intensity of the observed pixel positioned in the two-dimensional texture changes in the motional change or the non-motional change is judged by utilizing the fourth inherent characteristics.

Thereafter, some pixels are classified into the first or second classification type in the pixel classifying means by utilizing the first to fourth inherent characteristics. The first classification type (S1-ACR) denotes that an observed pixel is positioned in the one-dimensional texture and the luminous intensity of the observed pixel changes with time in a non-motional change, and the second classification type (S2-ACR) denotes that the observed pixel is positioned in the two-dimensional texture and the luminous intensity of the observed pixel changes with time in the non-motional change.

Thereafter, a region occupied by the first and second pixels classified into the first or second classification type is limitedly regarded as a candidate region of a contour of the moving region in the contour candidate limiting means. The reason that the region occupied by the first and second pixels is limitedly regarded as the candidate region is described.

The non-motional change of the luminous intensity in the first and second pixels denotes an accretion (or an occurrence) of a moving object or a disappearance of a moving object. Because the accretion or the disappearance of the moving object is observed when the observed pixel is positioned in a boundary region between the moving and static regions, the first and second pixels can be recognized to be positioned in the boundary region. Also, the contour of the moving region passes through the boundary region. Therefore, the region occupied by the first and second pixels can be regarded as the candidate region of the contour.

Thereafter, a line passing through a middle portion of the candidate region is determined, and the line is adopted as a contour of the moving region in the contour detecting means. Therefore, the contour of the moving region is detected.

Accordingly, a contour of a moving region can be stably detected with a high accuracy without requiring of a user to input an initial contour or without limiting the application of the detecting apparatus.

Also, the object is achieved by the provision of a detecting apparatus of a contour of a moving region, comprising:

inputting means for inputting a series of frames of dynamic image which consists of variable densities F(x,y,t) of pixels;

variable density gradient calculating means for calculating a variable density gradient fx=∂F(x,y,t)/∂x defined as an x directional gradient of the variable densities F(x,y,t) input to the inputting means, a variable density gradient fy=∂F(x,y,t)/∂y defined as a y directional gradient of the variable densities F(x,y,t) input to the inputting means and a variable density gradient ft=∂F(x,y,t)/∂t defined as a time-based variation of the variable densities F(x,y,t) input to the inputting means, for each of the pixels;

covariance calculating means for calculating covariances Sxx, Sxy, Sxt, Syx, Syy, Syt, Stx, Sty and Stt according to an equation $$Sij=\iiint (fi*fj)dxdydt \ (i,j \in \{x,y,t\})$$

for each of the pixels by utilizing the variable density gradients fx, fy and ft calculated in the variable density gradient calculating means, integration ranges being limited in a space-time region of an observed pixel selected from the pixels and another space-time region of neighboring pixels positioned near to the observed pixel;

inherent characteristic extracting means for extracting first, second, third and fourth inherent characteristics of the dynamic image by utilizing the covariances Sxx, Sxy, Sxt, Syx, Syy, Syt, Stx, Sty and Stt calculated in the covariance calculating means, the first inherent characteristic being utilized to judge whether or not an observed pixel selected from the pixels is positioned in a texture drawn in the dynamic image, the second inherent characteristic being utilized to judge whether the texture in which the observed pixel is positioned is a one-dimensional texture changing in a direction only or a two-dimensional texture changing in an x–y plane, the third inherent characteristic being utilized to judge whether luminous intensity of the observed pixel positioned in the one-dimensional texture changes in a motional change or a non-motional change, and the fourth inherent characteristic being utilized to judge whether luminous intensity of the observed pixel positioned in the two-dimensional texture changes in the motional change or the non-motional change;

first-stage pixel classifying means for classifying the pixels into first, second, third, fourth, fifth, sixth or seventh classification type by utilizing the first to fourth inherent characteristics extracted in the inherent characteristic extracting means, the first classification type (S0-FIX)

denoting that an observed pixel selected from the pixels is not positioned in any texture or the luminous intensity of the observed pixel does not change with time, the second classification type (S1-FIX) denoting that the observed pixel is positioned in the one-dimensional texture and the luminous intensity of the observed pixel does not change with time, the third classification type (S1-MOT) denoting that the observed pixel is positioned in the one-dimensional texture and the luminous intensity of the observed pixel changes with time in a motional change, the fourth classification type (S1-ACR) denoting that the observed pixel is positioned in the one-dimensional texture and the luminous intensity of the observed pixel changes with time in a non-motional change, the fifth classification type (S2-FIX) denoting that the observed pixel is positioned in the two-dimensional texture and the luminous intensity of the observed pixel does not change with time, the sixth classification type (S2-MOT) denoting that the observed pixel is positioned in the two-dimensional texture and the luminous intensity of the observed pixel changes with time in the motional change, and the seventh classification type (S2-ACR) denoting that the observed pixel is positioned in the two-dimensional texture and the luminous intensity of the observed pixel changes with time in the non-motional change;

second-stage pixel classifying means for re-classifying each of the pixels classified into the first, second, third or fourth classification type in the first-stage pixel classifying means into the first, second, third or fourth classification type to match a classification type of the observed pixel with classification types of neighboring pixels positioned near to the observed pixel;

contour candidate limiting means for recognizing first pixels classified into the seventh classification type in the first-stage pixel classifying means and second pixels re-classified into the fourth classification type in the second-stage pixel classifying means to be positioned in a boundary region between the moving region and a static region of the dynamic image and limitedly regarding a region occupied by the first and second pixels as a candidate region for a contour of the moving region; and contour detecting means for detecting a contour of the moving region by adopting a line passing through a middle portion of the candidate region limitedly determined in the contour candidate limiting means as the contour of the moving region.

In the above configuration, each of the pixels in which a series of frames of dynamic image is displayed is classified into one of the first, second, third, fourth, fifth, sixth and seventh classification types in the first-stage pixel classifying means by utilizing the first to fourth inherent characteristics. The first classification type (S0-FIX) denotes that an observed pixel is positioned in a no-texture region and is positioned in the static region because of the no change in the luminous intensity of the observed pixel. The second classification type (S1-FIX) denote that the observed pixel is positioned in a one-dimensional texture region and is positioned in the static region. The third classification type (S1-MOT) denotes that the observed pixel is positioned in the one-dimensional texture region and is positioned inside the moving region. The fourth classification type (S1-ACR) denotes that the observed pixel is positioned in the one-dimensional texture region and is positioned in the boundary region between the moving and the static regions. The fifth classification type (S2-FIX) denotes that the observed pixel is positioned in a two-dimensional texture region and is positioned in the static region. The sixth classification type (S2-MOT) denotes that the observed pixel is positioned in the two-dimensional texture region and is positioned inside the moving region. The seventh classification type (S2-ACR) denotes that the observed pixel is positioned in the two-dimensional texture region and is positioned in the boundary region.

However, the first to fourth classification types classified in the first-stage pixel classifying means cannot be always adopted as final classification types because the observed pixel is locally classified regardless of the relationship with neighboring pixels positioned near to the observed pixel. The reason is described in detail.

For example, in cases where no texture or few textures are drawn in a region consisting of the observed pixel and the neighboring pixels, even though the region is locally observed to check whether the region belongs to the moving region or the static region, it cannot accurately recognize in the contour candidate limiting means whether the region belongs to the moving region or the static region. Also, even though it is ascertained that the region belongs to the moving region, a moving direction of a moving object positioned in the moving region cannot be determined. That is, the first classification of the pixels has very low reliability.

Also, as shown in FIGS. 5A, 5B, in cases where a one-dimensional texture changing in an X1 direction is drawn in a dynamic image and a local region consisting of the observed pixel and the neighboring pixels is observed, a motional or accretion change of the texture at the observed pixel can be observed when a moving object having the one-dimensional texture is moved in the X1 direction (FIG. 5A). However, a motional or accretion change of the texture at the observed pixel cannot be observed when a moving object having the one-dimensional texture is moved in a Y1 direction perpendicular to the X1 direction (FIG. 5B). That is, the observed pixel to be classified into the third or fourth classification type is erroneously classified into the second classification type.

Therefore, pixels classified into the first to fourth classification type are required to be re-classified in the second-stage pixel classifying means by applying a consistency restriction to match a classification type of the observed pixel with classification types of the neighboring pixels.

That is, the pixels classified into the first, second, third or fourth classification type are re-classified in the second-stage pixel classifying means. Thereafter, a region occupied by the first pixels classified into the seventh classification type in the first-stage pixel classifying means and the second pixels re-classified into the fourth classification type in the second-stage pixel classifying means is limitedly regarded as a candidate region of a contour of the moving region in the contour candidate limiting means.

Thereafter, a line passing through a middle portion of the candidate region is determined, and the line is adopted as a contour of the moving region in the contour detecting means. Therefore, the contour of the moving region is detected.

Accordingly, a contour of a moving region can be stably detected with a high accuracy without requiring of a user to input an initial contour or without limiting the application of the detecting apparatus.

BRIEF DESCRIPTION OF THE DRAWINGS

The objects, features and advantages of the present invention will be apparent from the following description taken in conjunction with the accompanying drawings, in which.

DETAIL DESCRIPTION OF THE PREFERRED EMBODIMENTS

Figure 1:
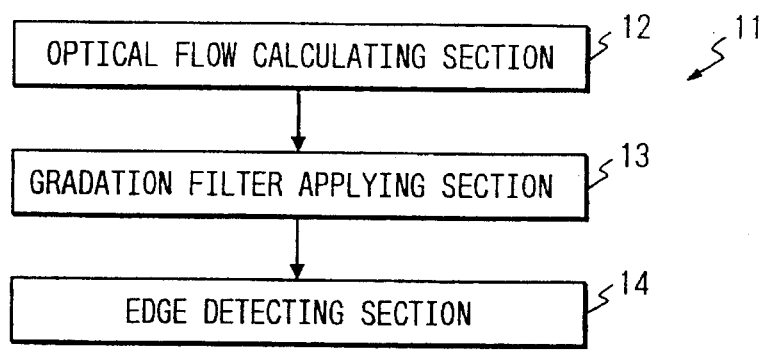
FIG. 1 is a block diagram of a first conventional detecting apparatus.
Figure 2:
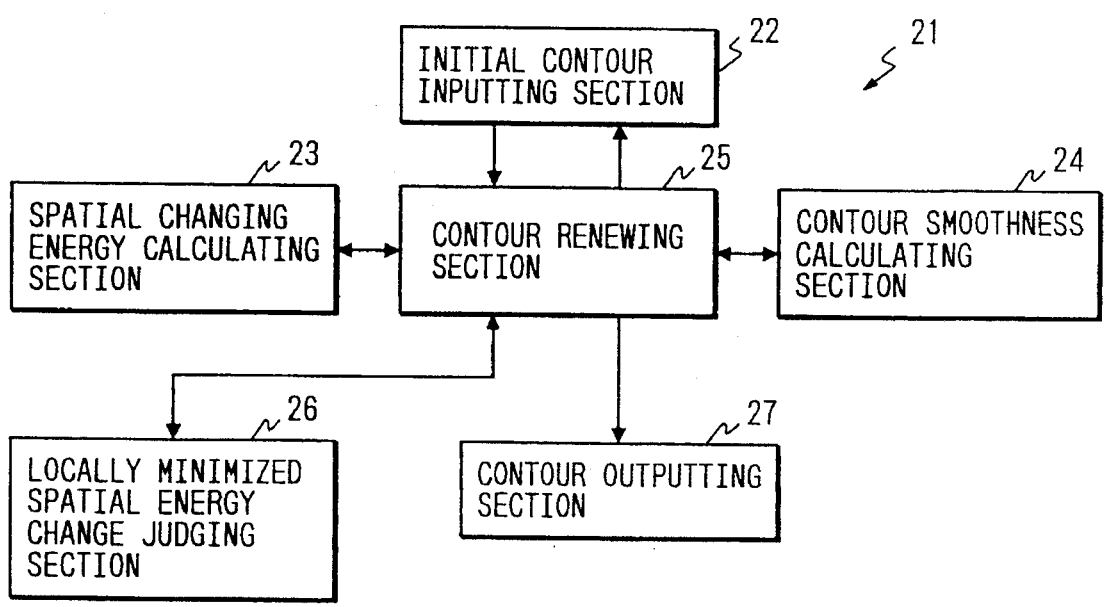
FIG. 2 is a block diagram of a second conventional detecting apparatus.

Preferred embodiments of a detecting apparatus of a contour of a dynamic image according to the present invention are described with reference to drawings.

Initially, mathematical preparation is described.

Where variable densities of pixels are represented by a symbol $F(x,y,t)$ in a space time, a spatial variable density gradient fx is defined as a gradient of the variable densities $F(x,y,t)$ in an X direction, a spatial variable density gradient fy is defined as a gradient of the variable densities $F(x,y,t)$ in a Y direction, and a time gradient ft is defined as a time-based variation of the variable densities $F(x,y,t)$ of pixels.

In mathematics, the variable density gradients fx, fy and ft are formulated by equations (1), (2) and (3).

$$fx = \partial F(x,y,t)/\partial x \qquad (1)$$

$$fy = \partial F(x,y,t)/\partial y \qquad (2)$$

$$ft = \partial F(x,y,t)/\partial t \qquad (3)$$

The variable density gradients fx, fy and ft can be calculated by utilizing an appropriate differential operator such as a Robert gradient.

Also, a covariance Sij of the variable density gradients fi, fj (fi, fj∈{fx, fy, ft}) is discretely calculated for each pixel of a dynamic image according to an equation (4).

$$Sij(p) = \Sigma fi(u_i) * fj(u_i) \qquad (4)$$

$$u_i \in \Gamma(p)$$

where the symbol p denotes an observed pixel, the symbol $u_i$ denotes a pixel positioned in the neighborhood of the observed pixel p, and the symbol $\Gamma(p)$ denotes a set of pixels $u_i$ positioned in the neighborhood of the observed pixel p. Therefore, the set $\Gamma(p)$ is formulated by an equation (5).

$$\Gamma(p) = \{u_1, u_2, \ldots\} \qquad (5)$$

Therefore, a covariance matrix [Sij] is defined according to an equation (6).

$$[Sij] = \begin{pmatrix} Sxx, & Sxy, & Sxt \\ Syx, & Syy, & Syt \\ Stx, & Sty, & Stt \end{pmatrix} \qquad (6)$$

Next, characteristic changes in variable densities of pixels such as light and shade are described to classify the pixels. The variable densities of pixels change according to inherent characteristics of a dynamic image.

For example, because a texture drawn in a dynamic image changes in a particular direction only or two directions regardless of whether the texture is positioned in a moving object, the variable density gradients fx, fy at a position of the observed pixel p linearly relates to each other in cases where the observed pixel p is positioned at an edge of a light or shade portion in the texture. In mathematics, a*fx+b*fy=0 where the symbols a, b are a constant is satisfied. Therefore, a spatial gradient distribution (fx, fy) is degenerated to a one-dimensional distribution. A texture changing in a direction only is called a one-dimensional texture, and a texture changing in two directions is called a two-dimensional texture.

In contrast, the spatial gradient distribution (fx, fy) of the variable densities $F(x,y,t)$ is generally spread in a two-dimensional distribution in cases where the observed pixel p is positioned inside the light or shade portion in the texture.

Also, in cases where the observed pixel p is positioned inside a moving object of a dynamic image, the variable density of the observed pixel p changes in a motional change, and the variable density gradients fx, fy and ft linearly relate to each other in a space-time gradient distribution (fx, fy, ft), as is well known. In mathematics, a*fx+b*fy+c*ft=0 where the symbol c is a constant is satisfied. Therefore, the space-time gradient distribution (fx, fy, ft) is degenerated to a two-dimensional distribution.

In contrast, in cases where the observed pixel p is positioned at a boundary region between a moving object and a static region of a dynamic image, the variable density of the observed pixel p changes in a non-motional change, and the space-time gradient distribution (fx, fy, ft) is generally spread in a three-dimensional distribution. The non-motional change denotes accretion (or occurrence) or disappearance of a moving object.

Accordingly, the characteristic changes in variable densities of the pixels can be expressed by the degree of the dimension in which the space-time gradient distribution (fx, fy, ft) of the variable densities is spread. Therefore, in cases where the degree of the dimension expressing the characteristic of the space-time gradient distribution (fx, fy, ft) is analyzed by utilizing components of the covariance matrix [Sij], the observed pixel p in the dynamic image can be classified on the basis of the characteristic changes in variable densities at a region in the neighborhood of the observed pixel p.

Next, a detecting apparatus of a contour of a moving region in a dynamic image according to an embodiment of the present invention is described.

Figure 3:
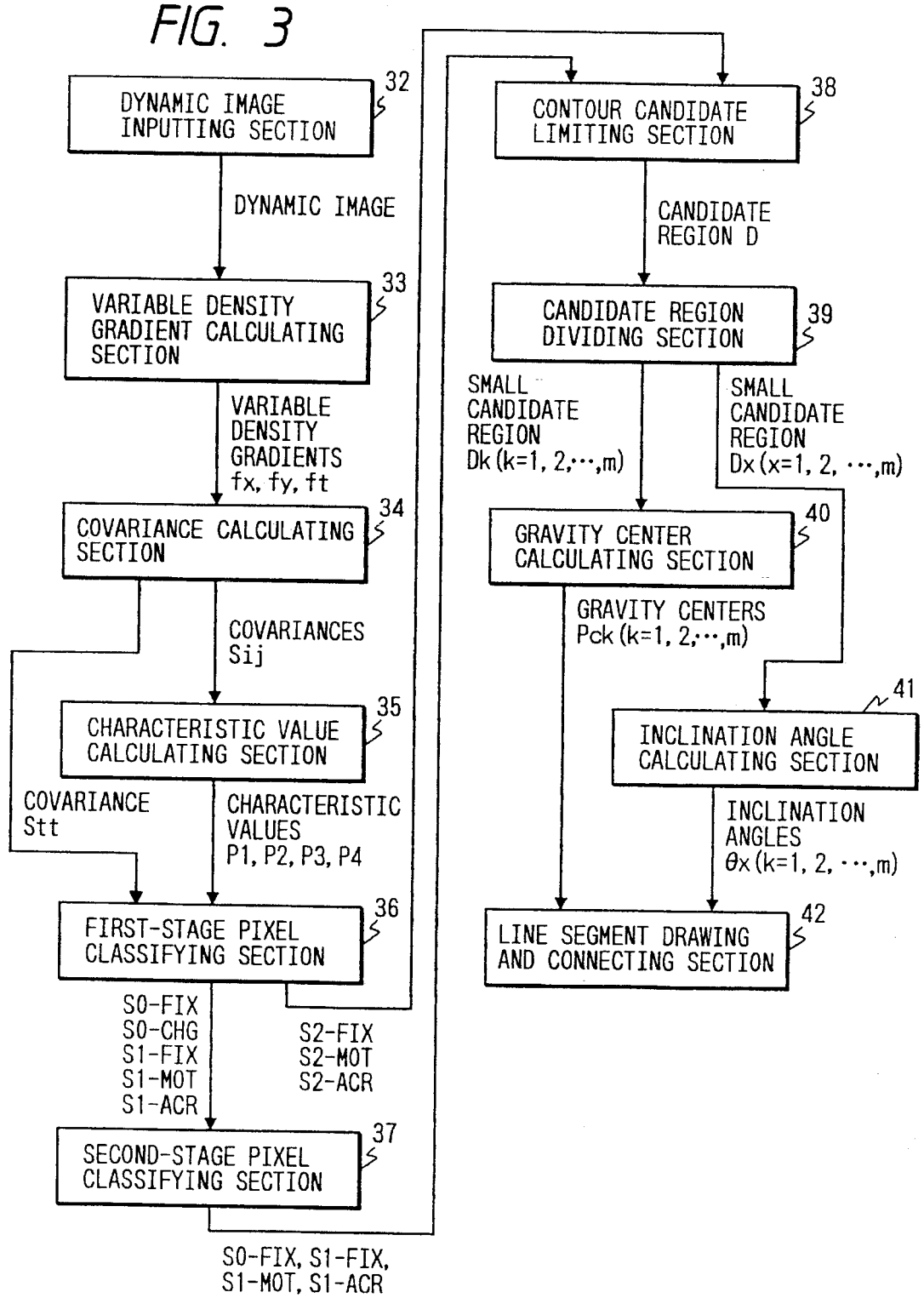
FIG. 3 is a block diagram of a detecting apparatus of a contour of a moving region in a dynamic image according to an embodiment of the present invention.

FIG. 3 is a block diagram of a detecting apparatus of a contour of a moving region in a dynamic image.

As shown in FIG. 3, a detecting apparatus 31 comprises a dynamic image inputting section 32 for inputting a series of frames of dynamic image which consists of variable densities F(x,y,t) of pixels, a variable density gradient calculating section 33 for calculating the variable density gradients fx, fy and ft for each pixel of the dynamic image, a covariance calculating section 34 for calculating the covariances Sxx, Sxy, Sxt, Syx, Syy, Syt, Stx, Sty and Stt of the variable density gradients fx, fy and ft for each pixel of the dynamic image, and a characteristic value calculating section 35 for calculating a characteristic value P1 denoting a degree of change in a variable density regardless whether the change is isotropic or anisotropic, a characteristic value P2 denoting a degree of an anisotropic change in a variable density, a characteristic value P3 denoting a ratio of a motion value in a one-dimensional texture to a non-motional value and a characteristic value P4 denoting a ratio of a motion value in a two-dimensional texture to the non-motional value, for each pixel of the dynamic image.

In the above configuration, after the dynamic image which consists of variable densities of pixels is input to the inputting section 32, the dynamic image is transferred to the variable density gradient calculating section 33. In the calculating section 33, the variable density gradients fx, fy and ft are calculated for each pixel of the dynamic image according to the equations (1) to (3). Thereafter, the variable density gradients fx, fy and ft are transferred to the covariance calculating section 34. In the calculating section 34, the covariances Sxx, Sxy, Sxt, Syx, Syy, Syt, Stx, Sty and Stt of the variable density gradients fx, fy and ft are calculated for each pixel of the dynamic image according to the equation (4). Thereafter, the covariances are transferred to the characteristic value calculating section 35. In the calculating section 35, four types of characteristic values P1 to P4 are calculated to estimate the degree of dimensions in which a space gradient (fx, fy) and a space-time gradient (fx, fy, ft) of the variable densities are distributed. That is, it is judged by utilizing the characteristic values P1 to P4 whether the space gradient (fx, fy) of the variable densities is distributed in a one-dimension or a two dimension. Also, it is judged by utilizing the characteristic values P1 to P4 whether the space-time gradient (fx, fy, ft) of the variable densities is distributed in a two dimension or a three dimension.

The characteristic value P1 is utilized to check whether or not the observed pixel is positioned in a texture of the dynamic image regardless of whether the texture is directed in a direction, and the characteristic value P1 is formulated by an equation (7).

$$P1 = (Sxx + Syy)^2 / \{(Sxx + Syy)^2 + \sigma_u^2\} \quad (7)$$

Here the symbol $\sigma_u$ denotes a constant for suppressing noise.

In cases where it is ascertained that the observed pixel is positioned in the texture, the characteristic value P2 is utilized to check whether the texture ascertained is either the one-dimensional texture or th two-dimensional texture. The characteristic value P2 is formulated by an equation (8).

$$P2 = \{(Sxx - Syy)^2 + 4*(Sxy)^2\} / \{(Sxx + Syy)^2 + \sigma_u^2\} \quad (8)$$

In cases where the existence of the one-dimensional texture is ascertained and it is ascertained that the luminous intensity of the observed pixel changes with the lapse of time, the characteristic value P3 is utilized to check whether or not the luminous intensity of the observed pixel changes in a motional change. The characteristic value P3 is formulated by an equation (9).

$$P3 = \frac{(Sxx + Syy)*Stt - \{(Sxt)^2 + (Syt)^2\}}{(Sxx + Syy + \sigma_s)(Stt + \sigma_t)} \quad (9)$$

Here the symbol $\sigma_t$ denotes a constant for suppressing noise.

In cases where the existence of the two-dimensional texture is ascertained and it is ascertained that the luminous intensity of the observed pixel changes with the lapse of time, the characteristic value P4 is utilized to check whether or not the luminous intensity of the observed pixel changes in a motional change. The characteristic value P4 is formulated by an equation (10).

$$P4 = \frac{det[Sij]}{\{Sxx*Syy - (Sxy)^2 + 2\sigma_s^2\}\{Stt + \sigma_t^2\}} \quad (10)$$

The characteristic values P3, P4 are described in "Detecting Contour in Image Sequences", NAGAO et al., IEICE TRANSACTIONS on Information and Systems Vol. E76-D, No.10, pp. 1162–1173, October 1993.

As shown in FIG. 3, the detecting apparatus 31 further comprises a first-stage pixel classifying section 36 for locally classifying the pixels on the basis of the characteristic changes in the variable densities of the pixels regardless of the relationship between the observed pixel and neighboring pixels surrounding the observed pixel p by utilizing the characteristic values P1 to P4, a second-stage pixel classifying section 37 for re-classifying some pixels classified into non-final types of which pixels are not finally classified in the classifying section 36 to match a classification type of the observed pixel with classification types of the neighboring pixels, and a contour candidate limiting section 38 for limiting a region occupied by a set of pixels classified into a classification type denoting that each of the pixels is positioned in a boundary region between the moving and static regions, as a candidate region D of a contour of the moving region.

Figure 4:
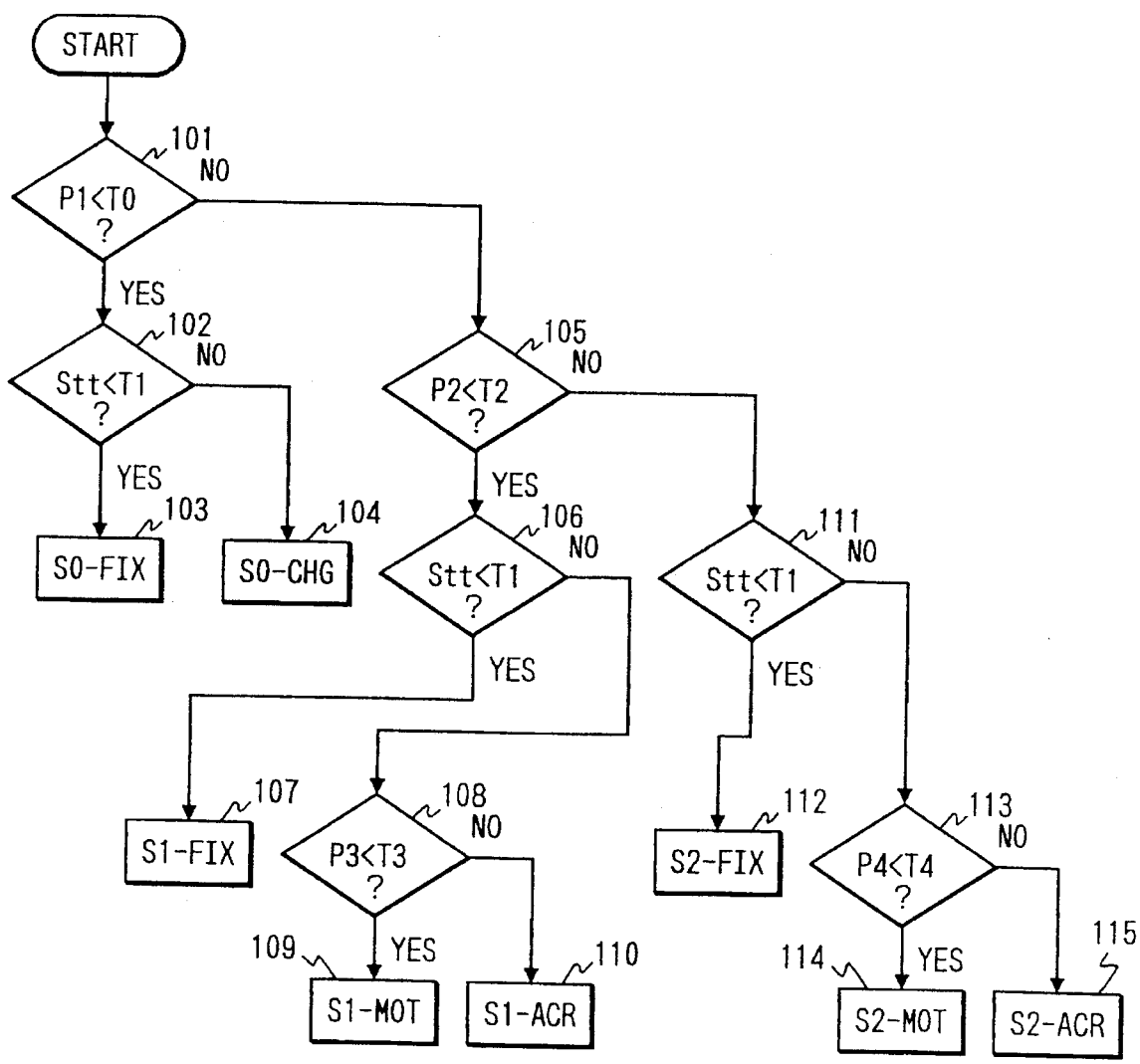
FIG. 4 is a flow chart showing the classification of pixels in a dynamic image according to a binary searching method performed in a first-stage pixel classifying section 36 shown in FIG. 3.

In the above configuration, the characteristic values P1 to P4 are transferred to the first-stage pixel classifying section 36. In the classifying section 36, each of the pixels in the dynamic image is locally classified into a classifying type on the basis of the characteristic changes in the variable densities of the pixels regardless of the relationship among the pixels according to a binary searching method. The binary searching method performed in the classifying section 36 is described in detail with reference to FIG. 4.

Initially, one of the pixels in the dynamic image is selected as an observed pixel. Thereafter, it is judged in a step 101 whether or not the characteristic value P1 formulated by the equation (7) is lower than a first constant T0. In cases where the characteristic value P1 is lower than the first constant T0, it is judged that the observed pixel is not positioned in any texture of the dynamic image. Therefore, the procedure of the binary searching method proceeds to a step 102.

In the step 102, it is judged whether or not the covariance Stt is lower than a second constant T1. In cases where the covariance Stt is lower than the second constant T1, it is judged that the luminous intensity of the observed pixel does not change with time. Therefore, the procedure proceeds to a step 103, and the observed pixel is classified into a S0-FIX type denoting a no-texture condition and a time base unchanging luminous intensity condition. Also, in cases where the covariance Stt is equal to or higher than the second constant T1, it is judged that the luminous intensity of the observed pixel changes with the lapse of time.

Therefore, the procedure proceeds to a step 104, and the observed pixel is classified into a S0-CHG type denoting a no-texture condition and a time base changing luminous intensity condition.

In contrast, in cases where the characteristic value P1 is equal to or higher than the first constant T0, it is judged in the step 101 that the observed pixel is positioned in a texture of the dynamic image. Therefore, the procedure proceeds to a step 105.

In the step 105, it is judged whether or not the characteristic value P2 formulated by the equation (8) is lower than a third constant T2. In cases where the characteristic value P2 is lower than the third constant T2, it is judged that the texture in which the observed pixel is positioned is a one-dimensional texture. Therefore, the procedure proceeds to a step 106.

In the step 106, it is judged whether or not the covariance Stt is lower than the second constant T1. In cases where the covariance Stt is lower than the second constant T1, it is judged that the luminous intensity of the observed pixel does not change with time. Therefore, the procedure proceeds to a step 107, and the observed pixel is classified into a S1-FIX type denoting a one-dimensional texture condition and the time base unchanging luminous intensity condition. Also, in cases where the covariance Stt is equal to or higher than the second constant T1, it is judged in the step 106 that the luminous intensity of the observed pixel changes with the lapse of time. Therefore, the procedure proceeds to a step 108.

In the step 108, it is judged whether or not the characteristic value P3 formulated by the equation (9) is lower than a fourth constant T3. In cases where the characteristic value P3 is lower than the fourth constant T3, it is judged that the luminous intensity of the observed pixel changes in a motional change. Therefore, the procedure proceeds to a step 109, and the observed pixel is classified into a S1-MOT type denoting the one-dimensional texture condition and a motional changing luminous intensity condition. Also, in cases where the characteristic value P3 is equal to or higher than the fourth constant T3, it is judged in the step 108 that the luminous intensity of the observed pixel does not change in the motional change. In other words, it is judged that an moving object accretes to or disappears from the observed pixel because the moving object is moved inside or outside the observed pixel positioned at a boundary region between the moving and static regions with the lapse of time. Therefore, the procedure proceeds to a step 110, and the observed pixel is classified into a S1-ACR type denoting the one-dimensional texture condition and a no-motional changing luminous intensity condition (or an accretion changing luminous intensity condition).

In contrast, in cases where the characteristic value P2 is equal to or higher than the third constant T2, it is judged in the step 105 that the texture in which the observed pixel is positioned is a two-dimensional texture. Therefore, the procedure proceeds to a step 111.

In the step 111, it is judged whether or not the covariance Stt is lower than the second constant T1. In cases where the covariance Stt is lower than the second constant T1, it is judged that the luminous intensity of the observed pixel does not change with time. Therefore, the procedure proceeds to a step 112, and the observed pixel is classified into a S2-FIX type denoting a two-dimensional texture condition and the time base unchanging luminous intensity condition. Also, in cases where the covariance Stt is equal to or higher than the second constant T1, it is judged in the step 111 that the luminous intensity of the observed pixel changes with the lapse of time. Therefore, the procedure proceeds to a step 113.

In the step 113, it is judged whether or not the characteristic value P4 formulated by the equation (10) is lower than a fifth constant T4. In cases where the characteristic value P4 is lower than the fifth constant T4, it is judged that the luminous intensity of the observed pixel changes in a motional change. Therefore, the procedure proceeds to a step 149, and the observed pixel is classified into a S2-MOT type denoting the two-dimensional texture condition and the motional changing luminous intensity condition. Also, in cases where the characteristic value P4 is equal to or higher than the fifth constant T4, it is judged in the step 113 that the luminous intensity of the observed pixel does not change in the motional change. In other words, it is judged that a moving object accretes to or disappears from the observed pixel because the moving object is moved inside or outside the observed pixel positioned at a boundary region between the moving and static regions with the lapse of time. Therefore, the procedure proceeds to a step 115, and the observed pixel is classified into a S2-ACR type denoting the two-dimensional texture condition and the no-motional changing luminous intensity condition (or the accretion changing luminous intensity condition).

Therefore, the observed pixel is necessarily classified into one of the classifying types. Thereafter, one of remaining pixels not selected as the observed pixel is repeatedly selected as an observed pixel, and the observed pixel newly selected is classified into one of the classifying types according to the procedure of the binary searching method. Therefore, all of the pixels in the dynamic image are classified into one of the classifying types.

The classification types of the pixels are shown in Table 1.

TABLE 1

| | |
|---|---|
| S0-FIX | no texture, and no change of luminous intensity in time base |
| S0-CHG | no texture, and change of luminous intensity in time base |
| S1-FIX | one-dimensional texture (the texture changes in a direction only), and no change of luminous intensity in time base |
| S1-MOT | one-dimensional texture (the texture changes in a direction only), and motional change of luminous intensity |
| S1-ACR | one-dimensional texture (the texture changes in a direction only), and no motional change of luminous intensity |
| S2-FIX | two-dimensional texture (the texture changes in two directions), and no change of luminous intensity in time base |
| S2-MOT | two-dimensional texture (the texture changes in two directions), and motional change of luminous intensity |
| S1-ACR | two-dimensional texture (the texture changes in two directions), and no motional change of luminous intensity |

Accordingly, because luminous intensity in a pixel positioned in a static region of the dynamic image does not change with time, there is a high probability that the pixels classified into the S0-FIX, S1-FIX or S2-FIX type are positioned in the static region. Also, because luminous intensity in a pixel positioned inside a moving region of the dynamic image changes in a relatively small degree with the lapse of time, there is a high probability that the pixels classified into the S1-MOT or S2-MOT type are positioned inside the moving region. Also, because luminous intensity in a pixel positioned in a boundary region between a moving region and a static region of the dynamic image changes in a relatively high degree with the lapse of time, there is a high probability that the pixels classified into the S1-ACR or S2-ACR type are positioned in the boundary region. Also, luminous intensity in a pixel positioned in a no-texture region of the dynamic image does not generally change with time. Therefore, the position of pixels classified into the S0-CHG type cannot be specified.

However, as is called an aperture problem in a computer-vision field, the S0-FIX, S0-CHG, S1-FIX, S1-MOT, and S1-ACR types into which some pixels are classified in the first-stage pixel classifying section 36 cannot be always adopted as final classification types because the pixels are locally classified regardless of the relationship among the pixels. The reason is described in detail.

For example, in cases where no texture or few textures are drawn in a region consisting of the observed pixel and neighboring pixels adjacent to the observed pixel, even though the region is locally observed to check whether the region belongs to a moving region or a static region, it cannot be accurately judged whether the region belongs to the moving region or the static region. Also, even though it is judged that the region belongs to the moving region, a moving direction of a moving object positioned in the moving region cannot be determined. That is, the classification of the pixels classified into the S0-FIX or S0-CHG type has very low reliability.

Figure 5A:
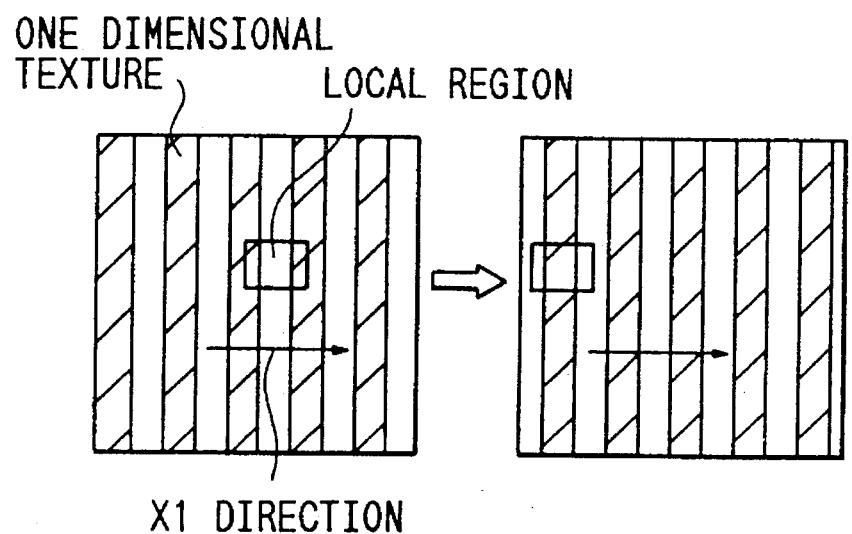
FIG. 5A show a motional or accretion change observed when a moving object having a one-dimensional texture is moved in a texture-changing direction.
Figure 5B:
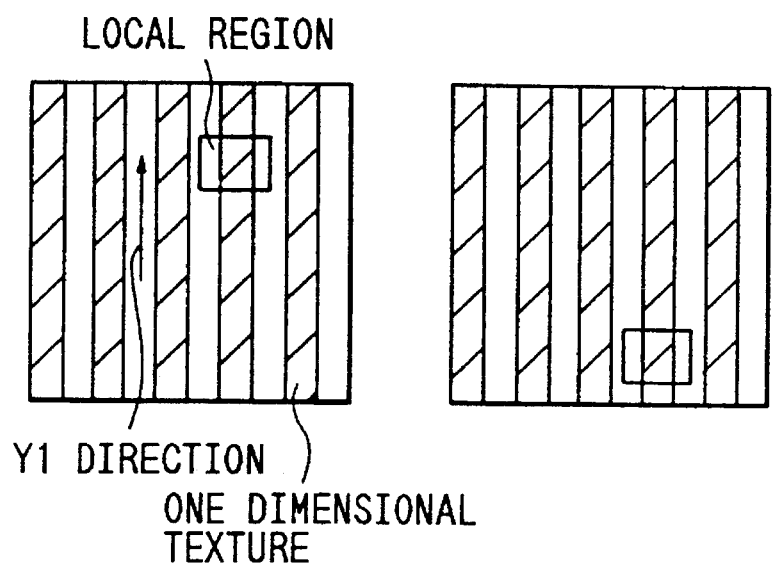
FIG. 5B show no change observed when a moving object having a one-dimensional texture is moved in a direction perpendicular to the texture-changing direction.

Also, as shown in FIGS. 5A, 5B, in cases where a one-dimensional texture changing in an X1 direction is drawn in a dynamic image and a local region consisting of the observed pixel and neighboring pixels adjacent to the observed pixel is observed, a motional or accretion change of the texture at the observed pixel can be observed when a moving object having the one-dimensional texture is moved in the X1 direction (FIG. 5A). However, a motional or accretion change of the texture at the observed pixel cannot be observed when a moving object having the one-dimensional texture is moved in a Y1 direction perpendicular to the X1 direction (FIG. 5B). That is, the observed pixel to be classified into the S1-MOT OR S1-ACR type is erroneously classified into the S1-FIX type.

Therefore, some pixels classified into the S0-FIX, S0-CHG, S1-FIX, S1-MOT or S1-ACR type are required to be re-classified in the second-stage pixel classifying section 37 by applying a consistency restriction to match a classification type of the observed pixel with classification types of the neighboring pixels.

Figure 6:
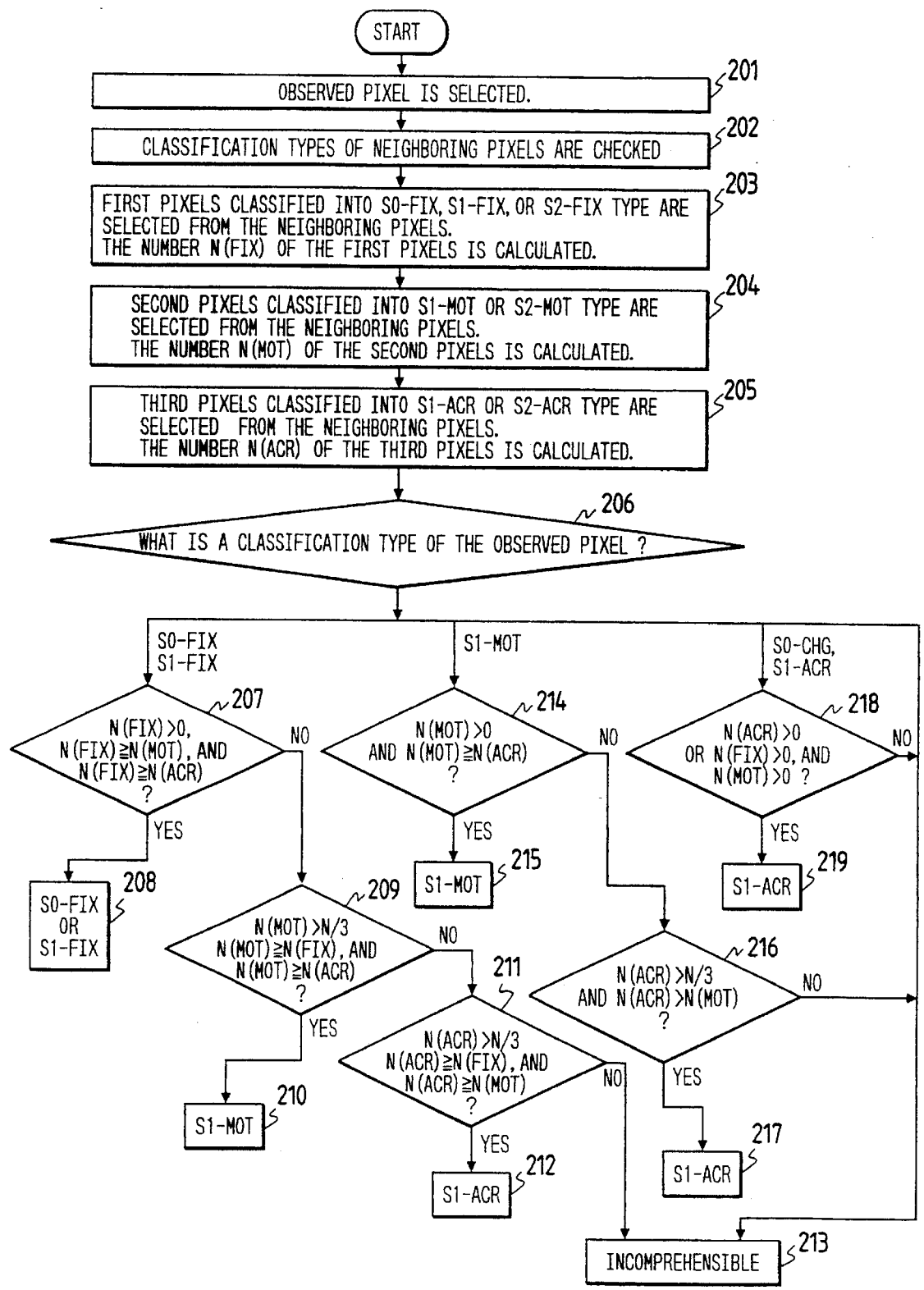
FIG. 6 is a flow chart showing the re-classification of pixels in a dynamic image according to a relaxation method performed by applying a consistency restriction in a second-stage pixel classifying section 37 shown in FIG. 3.

In the classifying section 37, the pixels classified into the S0-FIX, S0-CHG, S1-FIX, S1-MOT or S1-ACR type are re-classified according to a relaxation method. The relaxation method performed in the classifying section 37 is described in detail with reference to FIG. 6.

Initially, an observed pixel is selected from the pixels classified into the S0-FIX, S0-CHG, S1-FIX, S1-MOT or S1-ACR type in a step 201, and the classification types into which neighboring pixels positioned near to the observed pixel are classified are checked in a step 202. The number of the neighboring pixels is equal to N. In a step 203, first pixels classified into the S0-FIX, S1-FIX or S2-FIX type are selected from the neighboring pixels, and the number N(fix) of the first pixels is calculated. In a step 204, second pixels classified into the S1-MOT or S2-MOT type are selected from the neighboring pixels, and the number N(mot) of the second pixels is calculated. In a step 205, third pixels classified into the S1-ACR or S2-ACR type are selected from the neighboring pixels, and the number N(acr) of the third pixels is calculated.

In a step 206, the classification type into which the observed pixel is classified is judged. In cases where the observed pixel is classified into the S0-FIX or S1-FIX type, the procedure proceeds to a step 207.

In the step 207, it is judged whether or not three relations $N(fix)>0$, $N(fix) \geq N(mot)$ and $N(fix) \geq N(acr)$ are satisfied. In cases where the three relations are satisfied, the procedure proceeds to a step 208, and the classification type of the observed pixel is maintained to the S0-FIX or S1-FIX type. In cases where the three relations are not satisfied, the procedure proceeds to a step 209, and it is judged whether or not three relations $N(mot)>N/3$, $N(mot) \geq N(fix)$ and $N(mot) \geq N(acr)$ are satisfied. In cases where the three relations are satisfied, the procedure proceeds to a step 210, and the classification type of the observed pixel is changed to the HOT type. That is, the S0-FIX type of the observed pixel classified in the classifying section 36 is re-classified to the S0-MOT type in the classifying section 37, and the S1-FIX type of the observed pixel classified in the classifying section 36 is re-classified to the S1-MOT type in the classifying section 37. In cases where the three relations are not satisfied in the step 209, the procedure proceeds to a step 211, and it is judged whether or not three relations $N(acr)>N/3$, $N(acr) \geq N(fix)$ and $N(acr) \geq N(mot)$ are satisfied. In cases where the three relations are satisfied, the procedure proceeds to a step 212, and the classification type of the observed pixel is changed to the ACR type. That is, the S0-FIX type of the observed pixel classified in the classifying section 36 is re-classified to the S0-ACR type in the classifying section 37, and the S1-FIX type of the observed pixel classified in the classifying section 36 is re-classified to the S1-ACR type in the classifying section 37. In cases where the three relations are not satisfied in the step 211, the procedure proceeds to a step 213. In the step 213, the classified type of the observed pixel is processed as an incomprehensible type. For example, when a texture suddenly emerges on a region in which any texture is not drawn, the classified type of the observed pixel is re-classified to the incomprehensible type.

In cases where it is judged in the step 206 that the observed pixel is classified into the S1-MOT type, the procedure proceeds to a step 214.

In the step 214, it is judged whether or not two relations $N(mot)>0$ and $N(mot) \geq N(acr)$ are satisfied. In cases where the two relations are satisfied, the procedure proceeds to a step 215, and the classification type of the observed pixel is maintained to the S1-MOT type. In cases where the two relations are not satisfied, the procedure proceeds to a step 216, and it is judged whether or not two relations $N(acr)>N/3$ and $N(acr)>N(mot)$ are satisfied. In cases where the two relations are satisfied, the procedure proceeds to a step 217, and the S1-MOT type of the observed pixel classified in the classifying section 36 is re-classified to the S1-ACR type in the classifying section 37. In cases where the two relations are not satisfied in the step 216, the procedure proceeds to the step 213.

In cases where it is judged in the step 206 that the observed pixel is classified into the S1-ACR type, the procedure proceeds to a step 218.

In the step 218, it is judged whether or not a first relation $N(acr)>0$ or second relations $N(fix)>0$ and $N(mot)>0$ are satisfied. In cases where the first or second relations are satisfied, the procedure proceeds to a step 219, and the classification type of the observed pixel is maintained to the S1-ACR type. In cases where the first or second relations are not satisfied, the procedure proceeds to the step 213.

In cases where it is judged in the step 206 that the observed pixel is classified into the S0-CHG type, the procedure proceeds to the step 213.

Therefore, the observed pixel is necessarily re-classified into the S0-FIX, S1-FIX, S1-MOT, S1-ACR or incomprehensible type. Thereafter, another remaining pixel not selected as the observed pixel is repeatedly selected as an observed pixel, and the observed pixel newly selected is re-classified in the same manner according to the procedure of the relaxation method. As a result, all of the pixels classified into the S0-FIX, S0-CHG, S1-FIX, S1-MOT or S1-ACR type in the classifying section 36 can be re-classified in the classifying section 37.

Accordingly, because the pixels classified into the S0-FIX, S0-CHG, S1-FIX, S1-MOT or S1-ACR type in the classifying section 36 are re-classified by applying the consistency restriction, a classification type of the observed pixel theoretically matches with classification types of the neighboring pixels. Therefore, the classification types into which the pixels in the dynamic image are classified in the second-stage pixel classifying section 37 can be always adopted as final classification types.

Thereafter, the classification types of the pixels re-classified in the classifying section 37 and the classification types of the pixels classified into the S2-FIX, S2-MOT and S2-ACR types in the classifying section 36 are transferred to the contour candidate limiting section 38. In the limiting section 38, the pixels finally classified into the S0-FIX, S1-FIX or S2-FIX type in the classifying section 36 or 37 are recognized to be positioned in the static region, the pixels finally classified into the S1-MOT or S2-MOT type in the classifying section 36 or 37 are recognized to be positioned inside the moving region, and the pixels finally classified into the S1-ACR or S2-ACR type in the classifying section 36 or 37 are recognized to be positioned in the boundary region between the moving region and the static region.

Thereafter, a region occupied by a set of the pixels which are recognized to be positioned in the boundary region is limitedly regarded as a candidate region D of a contour of the moving region. That is, the contour of the moving region is limitedly positioned in the candidate region.

Figure 7:
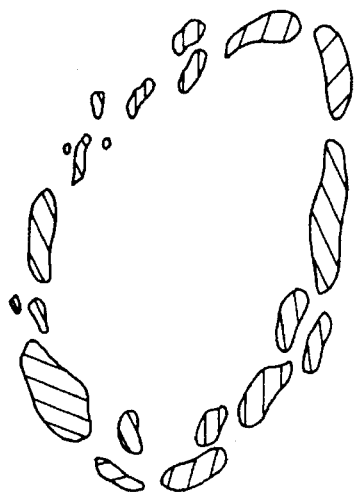
FIG. 7 shows a candidate region D consisting of a plurality of sub-regions Ds which is limitedly determined in a contour candidate limiting section 38 shown in FIG. 3.

Generally, the candidate region D is not formed in a closed shape but consists of a plurality of sub-regions Ds which are shown as shaded zones in FIG. 7. Each of the sub-regions Ds is occupied by one or more pixels finally classified into the S1-ACR or S2-ACR type. Therefore, a true contour can be detected by connecting line segments which each pass through a middle portion of the sub-region Ds.

As shown in FIG. 3, the detecting apparatus 31 further comprises a candidate region dividing section 39 for dividing the candidate region D into a plurality of small candidate regions Dk (k=1,2,3, ... m), a gravity center calculating section 40 for calculating a gravity center Pck of each of the small candidate regions Dk, an inclination angle calculating section 41 for calculating an inclination angle θk of each of the small candidate regions Dk, and a line segment drawing and connecting section 42 for drawing a line segment Lsk through the gravity center Pck at the inclination angle θk for each of the small candidate regions Dk and connecting the line segments Lsk drawn in the small candidate regions Dk to adopt a closed curve composed of the connected line segments Lsk as a contour of the moving region.

Figure 8:
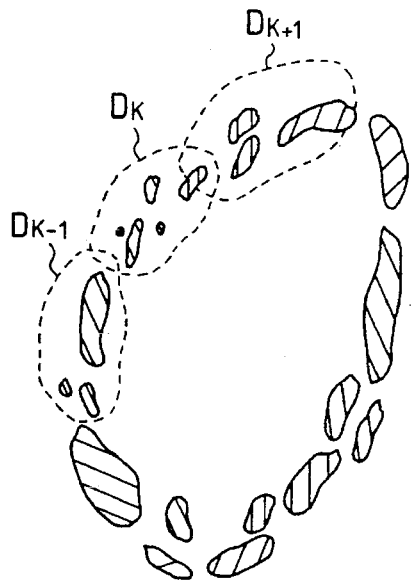
FIG. 8 shows the candidate region D divided into a plurality of small candidate regions Dk in a candidate region dividing section 39 shown in FIG. 3.

In the above configuration, as shown in FIG. 8, the candidate region D determined in the limiting section 38 is divided into a plurality of small candidate regions Dk (k=1,2,3, ... m). In each of the small candidate regions Dk, one or more sub-regions Ds are contained to set each of the small candidate regions Dk to almost a prescribed area. Therefore, the relationship between the candidate region D and the small candidate regions Dk is formulated by an equation (11).

$$D = \cup Dk \quad k=1,2,\ldots,m \tag{11}$$

Here the symbol $\cup$ denotes a union indicating a set.

In cases where the pixels included in the small candidate region Dk is n in number and positional vectors of the pixels are represented by Pki (i=1,2, ... ,n), a set of the positional vectors of the pixels is indicated by {Pki=(Xki, Yki)}. Here the symbol Xki denotes an x co-ordinate and the symbol Yki denotes a y co-ordinate in an x–y rectangular co-ordinate system.

Thereafter, a gravity center Pck=(Xck, Yck) of each of the small candidate regions Dk is calculated in the gravity center calculating section 40 according to an equation (12).

$$Pck = 1/N * \sum_{i=1}^{N} Pki \tag{12}$$

That is, the x co-ordinate Xck and y co-ordinate Yck of the gravity center Pck are calculated according to equations (13), (14).

$$Xck = 1/N * \sum_{i=1}^{N} Xki \tag{13}$$

$$Yck = 1/N * \sum_{i=1}^{N} Yki \tag{14}$$

Figure 9:
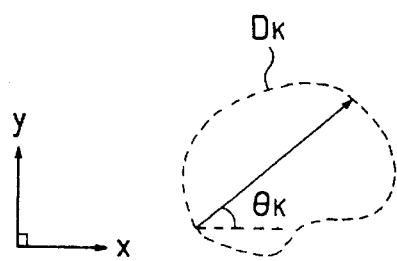
FIG. 9 shows an inclined angle Ok of the small candidate region Dk calculated in an inclined angle calculating section 41 shown in FIG. 3.

Thereafter, an inclination angle θk of each of the small candidate regions Dk is calculated in the inclination angle calculating section 41. As shown in FIG. 9, the inclination angle θk of the small candidate region Dk is defined as an inclination of a major axis of the small candidate region Dk of which the shape closely resemble an elliptical form.

In mathematics, an eigen vector Ev corresponding to a maximum eigen value $\lambda max^2$ of a 2×2 matrix is calculated as is formulated by an equation (15).

$$\lambda max^2 * Ev = \begin{pmatrix} A, & B \\ B, & C \end{pmatrix} * Ev \tag{15}$$

Here constants A, B and C are formulated by equations (16) to (18).

$$A = \sum_{i=1}^{N} Xki^2 \tag{16}$$

$$B = \sum_{i=1}^{N} Xki * Yki \tag{17}$$

$$C = \sum_{i=1}^{N} Yki^2 \tag{18}$$

In this case, an inclination of the eigen vector Ev accords with the inclination of the major axis of the small candidate region Dk. Therefore, the inclination of the eigen vector Ev is adopted as the inclination angle θk of each of the small candidate regions Dk.

Figure 10:
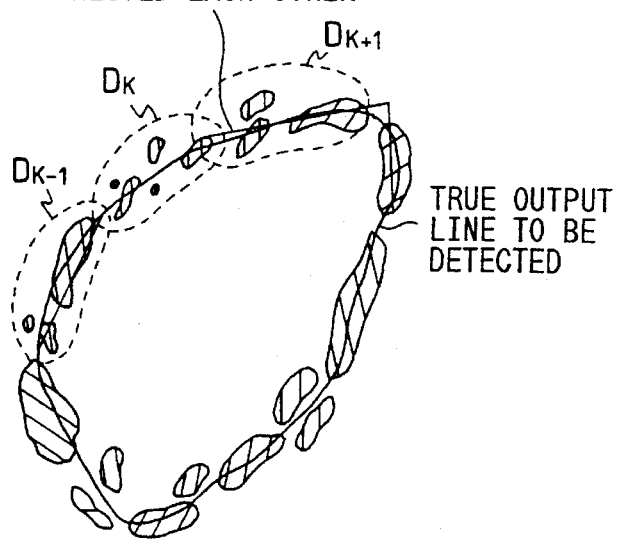
FIG. 10 shows a true contour of a moving region formed in a contour forming section 42 shown in FIG. 3.

Thereafter, as shown in FIG. 10, a line segment Lsk through the gravity center Pck at the inclination angle θk is drawn as a piece of a true contour of the moving region in each of the small candidate regions Dk in the line segment drawing and connecting section 42. Thereafter, the line segments Lsk, Lsk+1 adjacent to each other are connected, so that a closed curve composed of the connected line segments Lsk is formed. The closed curve is adopted as a true contour of the moving region to be detected.

Accordingly, because the pixels in the dynamic image are classified in the classifying sections 36, 37 according to the inherent characteristics of the dynamic image by utilizing the characteristic values P1 to P4 calculated in the calculating section 35 without calculating any speed field, the true contour of the moving region can be stably detected with a high accuracy in the sections 39 to 42 without requiring of a user to input an initial contour or without limiting the application of the detecting apparatus.

In the above embodiment, the classification types of the pixels classified in the classifying section 36 is re-classified in the classifying section 37 to enhance the accuracy of the classification. However, because there is a high probability that the pixels classified into the S1-ACR or S2-ACR type in the classifying section 36 are actually positioned in the boundary region, it is applicable that the re-classification in the classifying section 37 be omitted to limit a region occupied by a set of the pixels classified into the S1-ACR or S2-ACR type in the classifying section 36 as the candidate region D.

In this case, because the calculation required in the classifying section 37 can be omitted, the contour of the moving region can be determined at a high speed in the detecting apparatus 31.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A detecting method of a contour of a moving region of a dynamic image for distinguishing a moving object positioned in the moving region, comprising the steps of:

inputting a series of frames of dynamic image which consists of variable densities F(x,y,t) of pixels;

calculating a variable density gradient $fx=\partial F(x,y,t)/\partial x$ defined as an x directional gradient of the variable densities F(x,y,t) for each of the pixels;

calculating a variable density gradient $fy=\partial F(x,y,t)/\partial y$ defined as a y directional gradient of the variable densities F(x,y,t) for each of the pixels;

calculating a variable density gradient $ft=\partial F(x,y,t)/\partial t$ defined as a time-based variation of the variable densities F(x,y,t) for each of the pixels;

calculating covariances Sxx, Sxy, Sxt, Syx, Syy, Syt, Stx, Sty and Stt according to an equation $$Sij=\iiint (fi*fj)dxdydt\ (i,j\in\{x,y,t\})$$

for each of the pixels by utilizing the variable density gradients fx, fy and ft, integration ranges being limited in a space-time region of an observed pixel selected from the pixels and another space-time region of neighboring pixels positioned near to the observed pixel;

extracting first, second, third and fourth inherent characteristics of the dynamic image by utilizing the covariances Sxx, Sxy, Sxt, Syx, Syy, Syt, Stx, Sty and Stt, the first inherent characteristic being utilized to judge whether or not an observed pixel selected from the pixels is positioned in a texture drawn in the dynamic image, the second inherent characteristic being utilized to judge whether the texture in which the observed pixel is positioned is a one-dimensional texture changing in a direction only or a two-dimensional texture changing in an x–y plane, the third inherent characteristic being utilized to judge whether luminous intensity of the observed pixel positioned in the one-dimensional texture changes in a motional change or a non-motional change, and the fourth inherent characteristic being utilized to judge whether luminous intensity of the observed pixel positioned in the two-dimensional texture changes in the motional change or the non-motional change;

classifying one or more pixels into first or second classification type by utilizing the first to fourth inherent characteristics, the first classification type (S1-ACR) denoting that an observed pixel selected from the pixels is positioned in the one-dimensional texture and the luminous intensity of the observed pixel changes with time in a non-motional change, and the second classification type (S2-ACR) denoting that the observed pixel is positioned in the two-dimensional texture and the luminous intensity of the observed pixel changes with time in the non-motional change;

recognizing first pixels classified into the first classification type and second pixels classified into the second classification type as boundary pixels positioned in a boundary region between the moving region and a static region of the dynamic image and setting a region occupied by the boundary pixels as a candidate region for a contour of the moving region;

detecting a contour of the moving region by adopting a line passing through a middle portion of the candidate region as the contour of the moving region;

distinguishing a moving object positioned in the moving region of which the contour is detected; and processing the dynamic image in which the moving object distinguished exists to display the dynamic image in a displaying unit or transfer the dynamic image to an external unit.

2. A detecting method according to claim 1 in which the step of detecting a contour of the moving region includes:

dividing the candidate region into a plurality of small candidate regions;

calculating a gravity center of each of the small candidate regions divided;

calculating an inclination of each of the small candidate regions;

drawing a line segment through the gravity center at the inclination for each of the small candidate regions; and connecting the line segment of the small candidate regions to each other, a line composed of the connected line segments being adopted as the contour of the moving region.

3. A detecting method according to claim 1 in which the step of extracting first, second, third and fourth inherent characteristics includes:

formulating the first inherent characteristic P1 by an equation $$P1=(Sxx+Syy)^2/\{(Sxx+Syy)^2+\sigma_\mu^2\}$$

where the symbol $\sigma_\mu$ denotes a constant for suppressing noise, formulating the second inherent characteristic P2 by an equation $$P2=\{(Sxx-Syy)^2+4*(Sxy)^2\}/\{(Sxx+Syy)^2+\sigma_\mu^2\},$$

formulating the third inherent characteristic P3 by an equation $$P3 = \frac{(Sxx + Syy)*Stt - \{(Sxt)^2 + (Syt)^2\}}{(Sxx + Syy + \sigma_s)(Stt + \sigma_t)}$$

where the symbols $\sigma_s$ and $\sigma_t$ respectively denote a constant for suppressing noise, and formulating the fourth inherent characteristic P4 by an equation $$P4 = \frac{\det[Sij]}{\{Sxx*Syy - (Sxy)^2 + 2\sigma_s^2\}\{Stt + \sigma_t^2\}}$$

where a covariance matrix is defined by an equation $$[Sij] = \begin{pmatrix} Sxx, & Sxy, & Sxt \\ Syx, & Syy, & Syt \\ Stx, & Sty, & Stt \end{pmatrix}.$$

4. A detecting method according to claim 3 in which the step of recognizing first pixels includes:
   classifying the first pixels into the first classification type on condition that the first inherent characteristic P1 is equal to or higher than a first constant, the second inherent-characteristic P2 is lower than a third constant, the covariance Stt is equal to or higher than a second constant and the third inherent characteristic P3 is equal to or higher than a fourth constant, and
   classifying the second pixels into the second classification type on condition that the first inherent characteristic P1 is equal to or higher than the first constant, the second inherent characteristic P2 is equal to or higher than the third constant, the covariance Stt is equal to or higher than the second constant and the fourth inherent characteristic P4 is equal to or higher than a fifth constant.

5. A detecting method according to claim 2 in which the inclination of a small candidate region accords with an inclination of an eigen vector Ev corresponding to a maximum eigen value $\lambda max^2$ of a 2×2 matrix as formulated by equations $$\lambda max^2 * Ev = \begin{pmatrix} A, & B \\ B, & C \end{pmatrix} * Ev$$

$$A = \sum_{i=1}^{N} Xki^2$$

where the symbol Xki (i=1,2, ... N) denotes x coordinates of pixels $$B = \sum_{i=1}^{N} Xki*Yki$$

$$C = \sum_{i=1}^{N} Yki^2$$

included in the small candidate region and the symbol Yki denotes y coordinates of the pixels.

6. A detecting method of a contour of a moving region of a dynamic image for distinguishing a moving object positioned in the moving region, comprising the steps of:
   inputting a series of frames of dynamic image which consists of variable densities F(x,y,t) of pixels;
   calculating a variable density gradient fx=∂F(x,y,t)/∂x defined as an x directional gradient of the variable densities F(x,y,t), a variable density gradient fy=∂F(x,y,t)/∂y defined as a y directional gradient of the variable densities F(x,y,t) and a variable density gradient ft=∂F(x,y,t)/∂t defined as a time-based variation of the variable densities F(x,y,t) for each of the pixels;
   calculating covariances Sxx, Sxy, Sxt, Syx, Syy, Syt, Stx, Sty and Stt according to an equation $$Sij = \iiint (fi*fj)dxdydt \ (i,j \in \{x,y,t\})$$

for each of the pixels by utilizing the variable density gradients fx, fy and ft, integration ranges being limited in a space-time region of an observed pixel selected from the pixels and another space-time region of neighboring pixels positioned near to the observed pixel;
   extracting first, second, third and fourth inherent characteristics of the dynamic image by utilizing the covariances Sxx, Sxy, Sxt, Syx, Sxy, Syt, Stx, Sty and Stt, the first inherent characteristic being utilized to judge whether or not an observed pixel selected from the pixels is positioned in a texture drawn in the dynamic image, the second inherent characteristic being utilized to judge whether the texture in which the observed pixel is positioned is a one-dimensional texture changing in a direction only or a two-dimensional texture changing in an x–y plane, the third inherent characteristic being utilized to judge whether luminous intensity of the observed pixel positioned in the one-dimensional texture changes in a motional change or a non-motional change, and the fourth inherent characteristic being utilized to judge whether luminous intensity of the observed pixel positioned in the two-dimensional texture changes in the motional change or the non-motional change;
   classifying each of the pixels into first, second, third, fourth, fifth, sixth or seventh classification type by utilizing the first to fourth inherent characteristics, the first classification type (S0-FIX) denoting that an observed pixel selected from the pixels is not positioned in any texture or the luminous intensity of the observed pixel does not change with time, the second classification type (S1-FIX) denoting that the observed pixel is positioned in the one-dimensional texture and the luminous intensity of the observed pixel does not change with time, the third classification type (S1-MOT) denoting that the observed pixel is positioned in the one-dimensional texture and the luminous intensity of the observed pixel changes with time in a motional change, the fourth classification type (S1-ACR) denoting that the observed pixel is positioned in the one-dimensional texture and the luminous intensity of the observed pixel changes with time in a non-motional change, the fifth classification type (S2-FIX) denoting that the observed pixel is positioned in the two-dimensional texture and the luminous intensity of the observed pixel does not change with time, the sixth classification type (S2-MOT) denoting that the observed pixel is positioned in the two-dimensional texture and the luminous intensity of the observed pixel changes with time in the motional change, and the seventh classification type (S2-ACR) denoting that the observed pixel is positioned in the two-dimensional texture and the luminous intensity of the observed pixel changes with time in the non-motional change;
   re-classifying each of the pixels classified into the first, second, third or fourth classification type into the first, second third or fourth classification type to match a classification type of the observed pixel with classification types of neighboring pixels positioned near to the observed pixel;

recognizing first pixels classified into the seventh classification type and second pixels re-classified into the fourth classification type as boundary pixels positioned in a boundary region between the moving region and a static region of the dynamic image and setting a region occupied by the boundary pixels to a candidate region for a contour of the moving region; and detecting a contour of the moving region by adopting a line passing through a middle portion of the candidate region set to the contour of the moving region.

7. A detecting method according to claim 6 in which the step of re-classifying each of he pixels includes:

re-classifying the first classification type of the observed pixel into the fourth classification type on condition that the number N(acr) of the neighboring pixels classified into the fourth or seventh classification type satisfies $N(acr)>N/3$, $N(acr) \geq N(fix)$ and $N(acr) \geq N(mot)$, where the symbol N denotes the number of the neighboring pixels, the symbol N(fix) denotes the number of the neighboring pixels classified into the first, second or fifth classification type, and the symbol N(mot) denotes the number of the neighboring pixels classified into the third of sixth classification type, re-classifying the second classification type of the observed pixel into the fourth classification type on condition that relations $N(acr)>N/3$, $N(acr) \geq N(fix)$ and $N(acr) \geq N(mot)$ are satisfied, re-classifying the third classification type of the observed pixel into the fourth classification type on condition that relations $N(acr)>N/3$ and $N(acr)>N(mot)$ are satisfied, and maintaining the fourth classification type of the observed pixel to the fourth classification type on condition that a first relation $N(acr)>0$ is satisfied or second relations $N(fix)>0$ and $N(mot)>0$ are satisfied.

8. A detecting method according to claim 6 in which the step of detecting a contour of the moving region includes:

dividing the candidate region into a plurality of small candidate regions;

calculating a gravity center of each of the small candidate regions divided;

calculating an inclination of each of the small candidate regions;

drawing a line segment through the gravity center at the inclination for each of the small candidate regions; and connecting the line segments of the small candidate regions to each other, a line composed of the connected line segments being adopted as the contour of the moving region.

9. A detecting method according to claim 6 in which the step of extracting first, second, third and fourth inherent characteristics includes:

formulating the first inherent characteristic P1 by an equation $$P1=(Sxx+Syy)^2/\{(Sxx+Syy)^2+\sigma_\mu^2\}$$

where the symbol $\sigma_\mu$ denotes a constant for suppressing noise, formulating the second inherent characteristic P2 by an equation $$P2=\{(Sxx-Syy)^2+4*(Sxy)^2\}/\{(Sxx+Syy)^2+\sigma_\mu^2\},$$

formulating the third inherent characteristic P3 by an equation $$P3 = \frac{(Sxx + Syy)*Stt - \{(Sxt)^2 + (Syt)^2\}}{(Sxx + Syy + \sigma_s)(Stt + \sigma_t)}$$

where the symbols $\sigma_s$ and $\sigma_t$ respectively denote a constant for suppressing noise, and formulating the fourth inherent characteristic P4 by an equation $$P4 = \frac{det[Sij]}{\{Sxx*Syy - (Sxy)^2 + 2\sigma_s^2\}\{Stt + \sigma_t^2\}}$$

where a covariance matrix is defined by an equation $$[Sij] = \begin{pmatrix} Sxx, & Sxy, & Sxt \\ Syx, & Syy, & Syt \\ Stx, & Sty, & Stt \end{pmatrix}.$$

10. A detecting method according to claim 9 in which the step of classifying each of the pixels includes:

classifying the observed pixel into the first classification type on condition that the first inherent characteristic P1 is lower than a first constant and the covariance Stt is lower than a second constant, classifying the observed pixel into the second classification type on condition that the first inherent characteristic P1 is equal to or higher than the first constant, the second inherent characteristic P2 is lower than a third constant and the covariance Stt is lower than the second constant, classifying the observed pixel into the third classification type on condition that the first inherent characteristic P1 is equal to or higher than the first constant, the second inherent characteristic P2 is lower than the third constant, the covariance Stt is equal to or higher than the second constant and the third inherent characteristic P3 is lower than a fourth constant, classifying the observed pixel into the fourth classification type on condition that the first inherent characteristic P1 is equal to or higher than the first constant, the second inherent characteristic P2 is lower than the third constant, the covariance Stt is equal to or higher than the second constant and the third inherent characteristic P3 is equal to or higher than the fourth constant, classifying the observed pixel into the fifth classification type on condition that the first inherent characteristic P1 is equal to or higher than the first constant, the second inherent characteristic P2 is equal to or higher than the third constant and the covariance Stt is lower than the second constant, classifying the observed pixel into the sixth classification type on condition that the first inherent characteristic P1 is equal to or higher than the first constant, the second inherent characteristic P2 is equal to or higher than the third constant, the covariance Stt is equal to or higher than the second constant and the fourth inherent characteristic P4 is lower than a fifth constant, and classifying the observed pixel into the seventh classification type on condition that the first inherent characteristic P1 is equal to or higher than the first constant, the second inherent characteristic P2 is equal to or higher than the third constant, the covariance Stt is equal to or higher than the second constant and the fourth inherent characteristic P4 is equal to or higher than the fifth constant.

11. A detecting method according to claim 8 in which the inclination of a small candidate region accords with an inclination of an eigen vector Ev corresponding to a maximum eigen value $\lambda max^2$ of a 2×2 matrix as formulated by equations $$\lambda max^2 * Ev = \begin{pmatrix} A, & B \\ B, & C \end{pmatrix} * Ev$$

$$A = \sum_{i=1}^{N} Xki^2$$

$$B = \sum_{i=1}^{N} Xki*Yki$$

$$C = \sum_{i=1}^{N} Yki^2$$

where the symbol Xki (i=1,2, ... N) denotes x coordinates of pixels included in the small candidate region and the symbol Yki denotes y coordinates of the pixels.

12. A software directed apparatus, detecting a contour of a moving region of a dynamic image for distinguishing a moving object positioned in the moving region, comprising:

inputting means for inputting a series of frames of dynamic image which consists of variable densities F(x,y,t) of pixels;

variable density gradient calculating means directed by the software for calculating:

a variable density gradient fx=∂F(x,y,t)/∂x defined as an x directional gradient of the variable densities F(x,y,t) input to the inputting means, for each of the pixels;

a variable density gradient fy=∂F(x,y,t)/∂y defined as a y directional gradient of the variable densities F(x, y,t) input to the inputting means for each of the pixels; and a variable density gradient ft=∂F(x,y,t)/∂t defined as a time-based variation of the variable densities F(x,y,t) for each of the pixels;

covariance calculating means directed by the software for calculating covariances Sxx, Sxy, Sxt, Syx, Syy, Syt, Stx, Sty and Stt according to an equation $$Sij=\iiint(fi*fj)dxdydt \ (i,j\in\{x,y,t\})$$

for each of the pixels by utilizing the variable density gradients fx, fy and ft calculated by the variable density gradient calculating means under direction of the software, integration ranges being limited in a space-time region of an observed pixel selected from the pixels and another space-time region of neighboring pixels positioned near to the observed pixel;

inherent characteristic extracting means directed by the software for extracting first, second, third and fourth inherent characteristics of the dynamic image by utilizing the covariances Sxx, Sxy, Sxt, Syx, Syy, Syt, Stx, Sty and Stt calculated by the covariance calculating means under direction of the software, the first inherent characteristic being utilized to judge whether or not an observed pixel selected from the pixels is positioned in a texture drawn in the dynamic image, the second inherent characteristic being utilized to judge whether the texture in which the observed pixel is positioned is a one-dimensional texture changing in a direction only or a two-dimensional texture changing in an x-y plane, the third inherent characteristic being utilized to judge whether luminous intensity of the observed pixel positioned in the one-dimensional texture changes in a motional change or a non-motional change, and the fourth inherent characteristic being utilized to judge whether luminous intensity of the observed pixel positioned in the two-dimensional texture changes in the motional change or the non-motional change;

pixel classifying means directed by the software for classifying one or more pixels into first or second classification type by utilizing the first to fourth inherent characteristics extracted by the inherent characteristic extracting means under direction of the software, the first classification type (S1-ACR) denoting that an observed pixel selected from the pixels is positioned in the one-dimensional texture and the luminous intensity of the observed pixel changes with time in a non-motional change, and the second classification type (S2-ACR) denoting that the observed pixel is positioned in the two-dimensional texture and the luminous intensity of the observed pixel changes with time in the non-motional change;

contour candidate limiting means directed by the software for recognizing first pixels classified into the first classification type and second pixels classified into the second classification type by the pixel classifying means as boundary pixels positioned in a boundary region between the moving region and a static region of the dynamic image and setting a region occupied by the boundary pixels as a candidate region for a contour of the moving region;

contour detecting means directed by the software for detecting a contour of the moving region by adopting a line passing through a middle portion of the candidate region as the contour of the moving region;

distinguishing means directed by the software for distinguishing a moving object positioned in the moving region of which the contour is detected; and processing means for processing the dynamic image in which the distinguished moving object exists to provide an output indication thereof.

13. Apparatus according to claim 12, wherein said processing means for processing the dynamic image comprises means for displaying the dynamic image in a displaying unit.

14. Apparatus according to claim 12, wherein said processing means for processing the dynamic image comprises means for transferring the dynamic image to a unit external to an external apparatus.

15. A method of detecting a contour of a moving region of a dynamic image to be performed with the aid of a computer for distinguishing a moving object positioned in the moving region, comprising the steps of:

inputting a series of frames of dynamic image which consists of variable densities F(x,y,t) of pixels;

calculating with the aid of the computer a variable density gradient fx=∂F(x,y,t)/∂x defined as an x directional gradient of the variable densities F(x,y,t) for each of the pixels;

calculating with the aid of the computer a variable density gradient fy=∂F(x,y,t)/∂y defined as a y directional gradient of the variable densities F(x,y,t) for each of the pixels;

calculating with the aid of the computer a variable density gradient ft=∂F(x,y,t)/∂t defined as a time-based variation of the variable densities F(x,y,t) for each of the pixels;

calculating with the aid of the computer covariances Sxx, Sxy, Sxt, Syx, Syy, Syt, Stx, Sty and Stt according to an equation $$Sij = \iiint (fi*fj) dxdydt \quad (i,j \in \{x,y,t\})$$

for each of the pixels by utilizing the variable density gradients fx, fy and ft, integration ranges being limited in a space-time region of an observed pixel selected from the pixels and another space-time region of neighboring pixels positioned near to the observed pixel;

extracting with the aid of the computer first, second, third and fourth inherent characteristics of the dynamic image by utilizing the covariances Sxx, Sxy, Sxt, Syx, Syy, Syt, Stx, Sty and Stt, the first inherent characteristic being utilized to judge whether or not an observed pixel selected from the pixels is positioned in a texture drawn in the dynamic image, the second inherent characteristic being utilized to judge whether the texture in which the observed pixel is positioned is a one-dimensional texture changing in a direction only or a two-dimensional texture changing in an x–y plane, the third inherent characteristic being utilized to judge whether luminous intensity of the observed pixel positioned in the one-dimensional texture changes in a motional change or a non-motional change, and the fourth inherent characteristic being utilized to judge whether luminous intensity of the observed pixel positioned in the two-dimensional texture changes in the motional change or the non-motional change;

classifying with the aid of the computer one or more pixels into first or second classification type by utilizing the first to fourth inherent characteristics, the first classification type (S1-ACR) denoting that an observed pixel selected from the pixels is positioned in the one-dimensional texture and the luminous intensity of the observed pixel changes with time in a non-motional change, and the second classification type (S2-ACR) denoting that the observed pixel is positioned in the two-dimensional texture and the luminous intensity of the observed pixel changes with time in the non-motional change;

recognizing with the aid of the computer first pixels classified into the first classification type and second pixels classified into the second classification type as boundary pixels positioned in a boundary region between the moving region and a static region of the dynamic image and setting a region occupied by the boundary pixels as a candidate region for a contour of the moving region;

detecting with the aid of the computer a contour of the moving region by adopting a line passing through a middle portion of the candidate region as the contour of the moving region;

distinguishing with the aid of the computer a moving object positioned in the moving region of which the contour is detected; and processing with the aid of the computer the dynamic image in which the moving object distinguished exists to provide an output indication thereof.

16. A method according to claim 15, wherein said step of processing the dynamic image to provide an output indication thereof comprises displaying the dynamic image in a displaying unit.

17. A method according to claim 15, wherein said step of processing the dynamic image to provide an output indication thereof comprises transferring the dynamic image to a unit external to an apparatus implementing the method with the aid of the computer.

* * * * *